United States Patent [19]

Kaneko et al.

[11] Patent Number: 4,760,452
[45] Date of Patent: Jul. 26, 1988

[54] ELECTRONIC STILL CAMERA WITH DARK CURRENT MINIMIZED IN PRODUCED VIDEO SIGNAL

[75] Inventors: Kiyotaka Kaneko; Izumi Miyake; Kazuya Oda; Kimihide Takahashi, all of Tokyo, Japan

[73] Assignee: Fuji Photo Film Co., Ltd., Kanagawa, Japan

[21] Appl. No.: 12,029

[22] Filed: Feb. 9, 1987

[30] Foreign Application Priority Data

Feb. 12, 1986 [JP] Japan .................................. 61-26850

[51] Int. Cl.$^4$ ............................................. H04N 3/14
[52] U.S. Cl. ............................. 358/213.13; 358/909; 358/213.19
[58] Field of Search ............. 358/209, 213.13, 213.19, 358/225, 909

[56] References Cited

U.S. PATENT DOCUMENTS

| | | |
|---|---|---|
| 4,541,016 | 9/1985 | Ochi et al. .................... 358/213.19 |
| 4,566,912 | 12/1985 | Yamanaka et al. ............ 358/213.13 |
| 4,599,657 | 7/1986 | Kinoshita et al. ............. 358/213.13 |
| 4,603,354 | 7/1986 | Hashimoto et al. ........... 358/213.13 |
| 4,635,123 | 1/1987 | Masunaga et al. ............ 358/213.19 |
| 4,710,825 | 12/1987 | Okita et al. .................... 358/909 |

FOREIGN PATENT DOCUMENTS 59-105775  6/1984  Japan .

*Primary Examiner*—Jin F. Ng
*Assistant Examiner*—Stephen Brinich
*Attorney, Agent, or Firm*—Birch, Stewart, Kolasch & Birch

[57] ABSTRACT

An electronic still camera includes a solid-state imaging device for generating electric charges corresponding to an incident light thereto and for producing in the form of a unit of video signals the electric charges in response to a driving signal. An exposing unit has an optical shutter which opens and closes in response to an instruction signal to expose the imaging device to the incident light. A recording unit for rotating a rotary recording medium records the unit of video signals on the rotary recording medium. A phase detector detects a predetermined rotation phase of the recording medium to produce a phase detect signal, and a control unit is responsive to a shutter release button and the phase detecting unit for controlling the imaging device, exposing unit, and recording unit. The unit of video signals are recorded on the recording medium in rotation beginning from the predetermined rotation phase of the recording medium with reference to the phase detect signal. The control unit supplies the exposing unit in response to the shutter release button with a first instruction signal for opening the shutter at a point of time advanced by an exposure time with respect to the phase detect signal, supplies a driving signal to the imaging device immediately before the shutter is opened so as to cause the imaging device to discharge electric charges therefrom, and supplies a second instruction signal to the exposing unit to close the shutter. When the optical shutter is closed, a driving signal is fed to the imaging device at an ordinary video signal rate to cause electric charges of the imaging device to be developed in the form of a unit of video signals into the recording unit, which in turn records the unit of video signals on the recording medium.

4 Claims, 2 Drawing Sheets

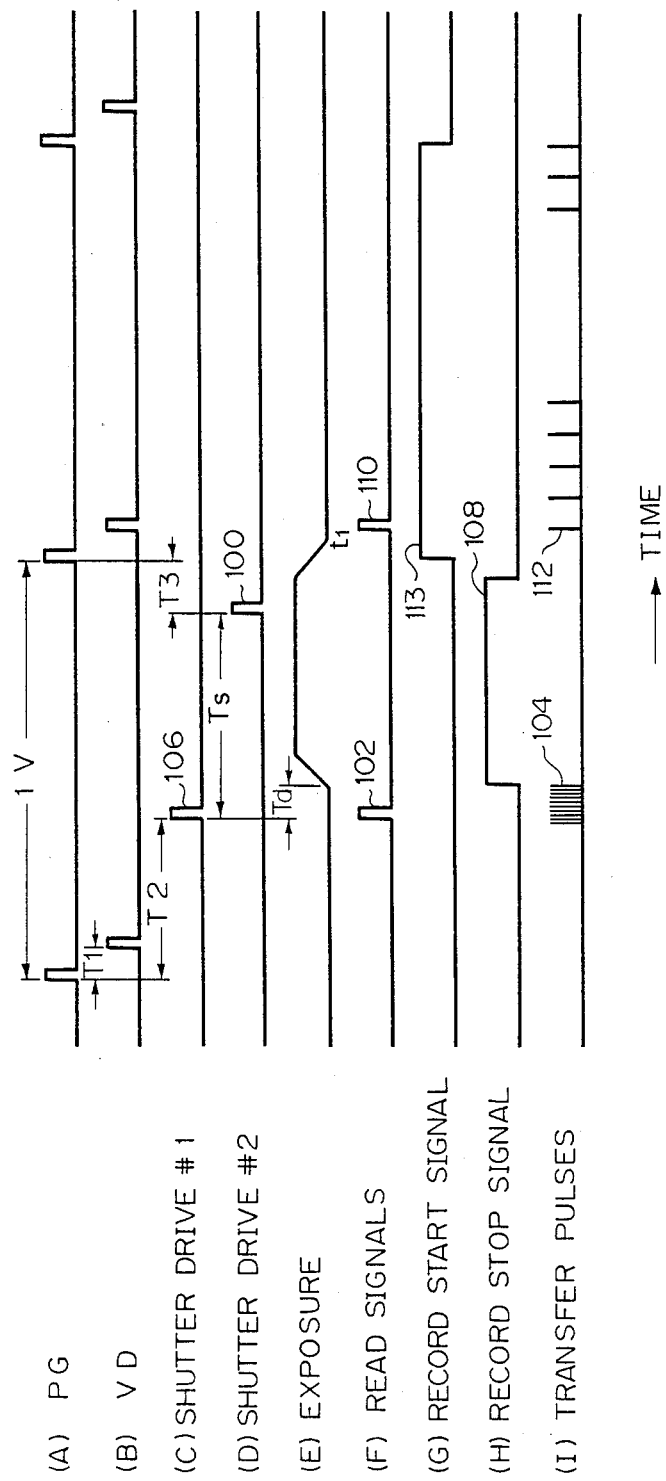

ELECTRONIC STILL CAMERA WITH DARK CURRENT MINIMIZED IN PRODUCED VIDEO SIGNAL

BACKGROUND OF THE INVENTION

1. Field of the Invention

The present invention relates to an electronic still camera, and in particular, to an electronic still camera in which video signals representative of a still image developed from a solid-state imaging device are recorded on a rotary recording medium such as a magnetic disk.

2. Description of the Prior Art

Unique to a solid-state imaging device is the problem of a noise mixed in the video signals due to a dark current caused by a thermal excitation of carriers in a device structure. When shooting a moving image, video signals are successively produced from a solid-state imaging device, and hence the noise caused by the dark current is not so remarkable. However, when compared with the moving picture, a quite higher clarity or distinctness is required for a still picture; furthermore, when shooting a still picture, video signals are read out from the imaging device only after the shutter is opened to expose the solid-state imaging device to a light incident from an object. Consequently, there exists a higher possibility for carriers caused by the dark current to be accumulated in the device structure, which requires a careful removal of the noise component due to the dark current to reproduce a picture with a high quality.

To solve the problem, according to the Japanese Patent Laid-Open Publication No. 105775/1984, there has been disclosed an electronic still camera in which a trailing edge of a shutter open signal for opening a shutter to expose a solid-state image device is controlled to be substantially overlapped with a leading edge of a recording gate signal for recording video signals from the solid-state imaging device onto a recording medium. However, for a mechanism of a mechanical shutter, there exists a quite long time delay from when a shutter open signal is energized to when a plane of the shutter is actually opened and closed. Consequently, in a camera using such a shutter mechanism, even if the trailing edge of the shutter open signal is controlled to be substantially overlapped with the leading edge of the recording gate signal, a dark current which cannot be ignored may flow during the delay time in some cases.

SUMMARY OF THE INVENTION

It is therefore an object of the present invention to provide an electronic still camera capable of recording a still picture with a high quality, thereby removing the disadvantage of the prior art technique.

According to the present invention there is provided an electronic still camera comprising solid-state imaging means for generating electric charges corresponding to an incident light thereto and for producing in the form of a unit of video signals the electric charges in response to a driving signal, exposing means having an optical shutter which opens and closes in response to an instruction signal to expose said solid-state imaging means to the incident light, recording means for rotating a rotary recording medium to record the unit of video signals on the rotary recording medium, phase detecting means for detecting a predetermined rotation phase of the rotary recording medium to produce a phase detect signal, and control means responsive to a shutter release button and the phase detecting means for controlling the solid-state imaging means, the exposing means, and the recording means. In the device of the present invention, the unit of video signals is recorded on the rotary recording medium beginning from the predetermined rotation phase of the rotary recording medium with reference to the phase detect signal. The control means, in response to the shutter release button, supplies said exposing means with a first instruction signal for opening the optical shutter at a point of time advanced by an exposure time with respect to the phase detect signal, supplies a driving signal to said imaging means immediately before the optical shutter is opened to cause said imaging means to deliver electric charges therefrom, and supplies a second instruction signal to said exposing means to close the optical shutter, supplying, when the optical shutter is closed, a driving signal to the imaging means at an ordinary video signal rate to cause electric charges in the imaging means to be developed in the form of a unit of video signals into the recording means, said recording means recording the unit of video signals on the recording medium.

BRIEF DESCRIPTION OF THE DRAWINGS

The objects and features of the present invention will become more apparent from the consideration of the following detailed description taken in conjunction with the accompanying drawings in which:

FIG. 2 shows waveforms appearing at the positions of the circuitry shown in FIG. 1.

DESCRIPTION OF THE PREFERRED EMBODIMENT

Figure 1:
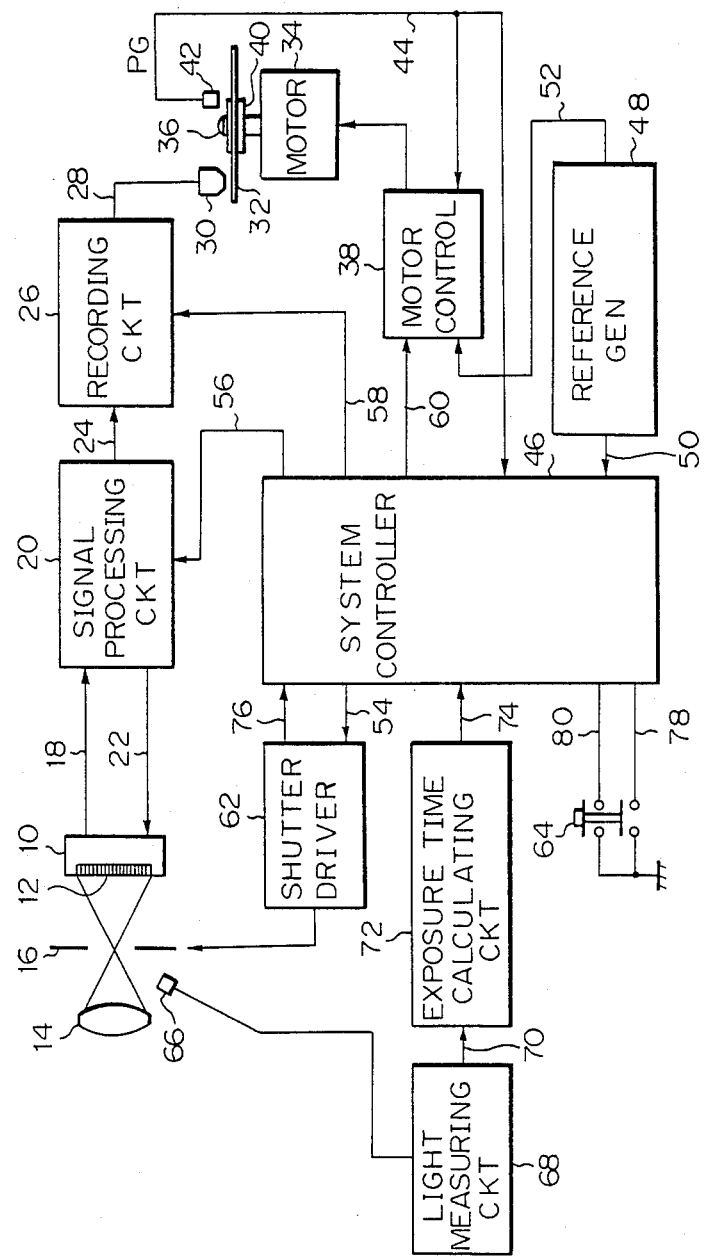
FIG. 1 is a schematic block diagram showing the circuit configuration of an embodiment of an electronic still camera according to the present invention.

An embodiment of an electronic still camera in accordance with the present invention will be described in detail with reference to the accompanying drawings.

Referring now to FIG. 1, there is shown an embodiment of the present invention in which an imaging lens optical system 14 and an optical shutter 16 are disposed before an array of photosensitive cells of a solid-state imaging device 10 basically comprising a frame transfer type charge-coupled device. The optical shutter 16 includes a conventional exposing mechanism which is driven to be opened and closed in response to a shutter driver 62.

The solid-state imaging device 10 has a video output 18 connected to a signal processing circuit 20, which drives the array of photosensitive cells 12 of the solid-state imaging device 10 via a control line 22 to receive a video signal representative of an image formed on the cell array, thereby forming a video signal of a predetermined format from the video signal delivered from the output terminal 18. The processing circuit 20 has an output 24 connected to a recording circuit 26, which conducts a frequency modulation on a video signal from the signal processing circuit 20 to produce the resultant signal from a modulated video signal output 28 connected to a magnetic recording head 30.

The magnetic recording head 30 is moved to be positioned over a desired track of a magnetic disk 32 by a head moving mechanism, not shown, and comprises an electromagnetic transducing device for recording a video signal. The magnetic disk 32 is detachably fixed on a rotation shaft 36 to be driven by a motor 34 and constantly rotates in a predetermined direction under the control of the motor 34 and a control circuit 38 therefor.

In the neighborhood of a core 40 of the magnetic disk 32, there is disposed a phase detector 42, which generates a phase detect signal PG at a predetermined angle of the rotation phase of the magnetic disk 32. The signal PG has a period substantially equal to a 1V period of the video signal in its stable state and is supplied on a connecting line 44 to the motor control 38 and a system controller 46.

The overall operation of a camera 100 is controlled by the system controller 46. A connecting line 50 of the system controller 46 and a connecting line 52 of the motor control 38 are supplied with a reference signal having a stable, predetermined frequency from a reference signal generator 48. The system controller 46 generates on the basis of the reference signal various synchronizing signals which include a vertical synchronization signal VD of the video signal and are in turn used to control the shutter drive 62, the signal processing circuit 20, the recording circuit 26, and the motor control 38 in time with these signals as indicated by control lines 54, 56, 58, and 60, thereby recording in response to an operation of a shutter release button 64 a unit of, for example, a field of still picture video signals on a track of the magnetic disk 32.

In the vicinity of the imaging lens optical system 14, there is disposed an optical sensor device 66. Based on an output signal from the optical sensor device 66, a light measuring circuit 68 measures the brightness of a light incident thereto from an object. The light measuring circuit 68 has an output 70 reflecting a measured light value, the output 70 being connected to an exposure time calculating circuit 72. When the calculating circuit 72 is set to the aperture-priority automatic exposure mode, this circuit 72 functions as determining an exposure speed according to the stop value, namely, an exposure time Ts, FIG. 2. A calculated value output 74 therefrom is connected to the system controller 46. A desired exposure time Ts can be set to the exposure time calculating circuit 72. If the calculating circuit 72 is in other than the aperture-priority automatic exposure mode, the value of the exposure time Ts set thereto is delivered to the output 74.

Referring now to timing diagrams of FIG. 2, the operation of this system will be described. When the magnetic disk 32 is mounted on the rotation shaft 36 of the motor 34, the system controller 46 controls the head moving mechanism to move the magnetic recording head 30 to be located over an unrecorded track.

If this system is, for example, in the aperture-priority automatic exposure mode, the light measuring circuit 68 measures the brightness of the object based on the output signal from the light sensor device 66 and the exposure time calculating circuit 72 in turn calculates the value of the exposure time Ts according to the stop value set on the basis of the measured value. The calculated value output 74 therefrom is fed into the system controller 46. If this system is in other than the aperture-priority automatic exposure mode, the exposure time Ts set beforehand is produced.

When the shutter release button 64 is depressed, a signal is fed to a signal line 78 at the first stage of the stroke thereof and then the system controller 46 controls the motor 34 via the motor control circuit 38 in response to the signal, so that the magnetic disk 32 will constantly be rotated at a rotation speed synchronized with the reference signal delivered from the reference signal generator 48. The system controller 46 controls the motor control 38 and then the phase detector 42 produces a phase detect signal PG to be delivered at a point of time which is advanced with respect to a vertical synchronization signal VD obtained from the reference signal by a predetermined phase difference, 7H±2H, for example. When the phase difference, namely, the period of T1 shown in FIG. 2 reaches the value 7H with the allowance of ±2H, the phase lock state is established, and then the system controller 46 is set to a state in which the shutter 16 is allowed to be opened.

If the shutter release button 64 is further deeply depressed, a signal is fed to a signal line 80 at a second stage of the stroke thereof and then the system controller 46 controls the shutter driving circuit 62 in response to the signal.

Referring now to FIG. 2, the operation will be described in more detail. The system controller 46 calculates a period of time T2 by subtracting from the period of the signal PG the total of the exposure time value Ts supplied from the exposure time calculating circuit 72 and the time T3 to be elapsed from when the second shutter signal 100, FIG. 2, line (D), causing the rear plane of the shutter 16 to move, is issued to when the rear plane is actually and completely closed.

At an occurrence of the signal PG, the system controller 46 achieves counting for the lapse of the period of time T2. When the time T2 is elapsed, the system controller 46 supplies a first read signal 102 to the control line 56 connected to the signal processing circuit 20 and produces a high-speed transfer pulse 104. Unlike the conventional transfer pulse, which is of the same signal speed as the horizontal synchronization signal or of the pixel frequency of the video signals, the high-speed transfer pulse 104 comprises horizontal and vertical transfer pulses having a considerably higher frequency than this for the array of photosensitive cells 12. The signal processing circuit 20 drives the solid-state imaging device 10 by use of the high-speed transfer pulse 104 at a high speed so as to cause electric charges stored so far to be developed therefrom.

The electric charges stored up to this point in the solid-state imaging device 10 are undesired charges, namely, they will constitute the dark current due to the thermal excitation in the structure of the imaging device 10 and may possibly be mixed into video signals as a noise. However, the high-speed transfer pulse 104 causes these charges to be developed at a high speed during the short period of time Td by the time when the exposure is effected. The signal processing circuit 20 ignores the thus developed charges from a video signal.

At an occurrence of the read signal, the system controller 46 generates a first shutter signal 106 which opens and moves a front plane of the shutter 16 and feeds the signal 106 on the control line 54 to the shutter driving circuit 62, which then opens the front plane of the shutter 16 in response to the signal 106. The front plane actually moves after a mechanical time delay Td unique to the driving mechanism, FIG. 2, line (E).

When the delay time Td is substantially elapsed, the system controller 46 delivers a read inhibit signal 108 over the control line 56 to the signal processing circuit 20. The period of time in which the signal 108 is produced is in this embodiment designed to be substantially identical to the exposure time Ts. Consequently, the signal processing circuit 20 inhibits the signal to be read thereafter from the solid-state imaging device 10.

The system controller 46 counts the exposure time from the occurrence of the first shutter signal 106. When the exposure time becomes equal to the calculated value or the set value Ts described above, the system controller 46 feeds the second shutter signal 110 over the control line 54 to the shutter driving circuit 62, which then opens the rear plane of the shutter 16 in response to the signal 110. The rear plane also actually moves after a mechanical time delay unique to the driving mechanism, FIG. 2, line (E). About this point of time, the system controller 46 disables the read inhibit signal 108 on the control line 56.

At an occurrence of the next signal PG, namely, at a point of time when a period of 1V is elapsed from the first occurrence of the PG signal, the system controller 46 produces a read instructing signal 112 on the control line 58 to the recording circuit 26. When the rear plane of the shutter 16 is completely closed, the shutter driving circuit 62 delivers to the signal line 76 a signal indicating the completion of the exposure.

In response to this signal, the system controller 46 generates a second read signal in synchronism with the occurrence of the next vertical synchronization signal VD. The second read signal is also supplied on the control line 56 to the signal processing circuit 20. At the same time, the system controller 46 feeds the ordinary transfer pulse on the control line 56 for a period of 1V. The transfer pulse 112 comprises the vertical and horizontal transfer pulse signals of the array of photosensitive cells 12 having the horizontal synchronization signal and pixel frequency of ordinary video signals. Based on the transfer pulse 112, the signal processing circuit 20 drives the solid-state imaging device 10 at the ordinary video signal rate, so that electric charges stored therein are fed to the signal line 18.

Since the recording circuit 26 is supplied with the record instruction signal 113 from the system controller 46 for a period of 1V as described above, the video signals delivered from the signal processing circuit 20 are modulated in the recording circuit 26 for the same period of time to be fed to the magnetic recording head 30, which in turn records the signals on a track of the magnetic disk 32. As a result, the video signals obtained during the period of 1V are recorded on the track of the magnetic disk 32 beginning from a position delayed by a predetermined phase of T1 with respect to the signal PG.

In this embodiment, the video signals recorded on the magnetic disk 32 are substantially free from the signal component caused by the dark current flowing in the solid-state imaging device 10. This is achieved by discharging at a high speed the dark current immediately before the exposure of the solid-state imaging device 10 and by developing the video signals from the imaging device 10 soon after the completion of the exposure without a delay.

Naturally in addition, the video signals are recorded on respective tracks of the magnetic disk 32 beginning from or terminating at the reference position, namely, a position within ±1H of a position of the occurrence of the signal PG. If the phase difference between the position of the occurrence of the signal PG and the vertical synchronization signal of the video signals recorded on the magnetic disk 10 is different between the tracks, namely, if the starting/terminating position of the recording is not located at a position advanced by a predetermined phase difference 7H with the predetermined tolerance ±2H with respect to the leading edge of the vertical synchronization signal, then at a reproduction of the video signals recorded on such a magnetic disk with a reproducing apparatus, a disturbance of the synchronization signal generated at a starting or terminating position of a recording and a noise signal due to a defect of the video signals appear within the effective viewing area of the screen of a television set, which leads to a deterioration of the reproduced picture. However, with the magnetic disk subjected to a recording by use of the apparatus of the present invention, the occurrence of the disadvantageous phenomenon can be minimized.

As described above, according to the present invention, the dark current is discharged and eliminated immediately before the exposure of the solid-state imaging device and the video signals are developed from the imaging device soon after the completion of the exposure, which substantially removes the signal component caused by the dark current in the imaging device from the video signals which is to be recorded on a rotary recording medium. Consequently, the present invention effects a recording of the video signals from which a still picture is reproduced with a high quality.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An electronic still camera comprising:
   solid-state imaging means for generating electric charges related to incident light applied thereto and for developing the electric charges in the form of a unit of video signals in response to a driving signal;
   exposing means having an optical shutter which opens and closes in response to an instruction signal to expose said solid-state imaging means to the incident light;
   recording means for rotating a rotary recording medium to record the unit of video signals on the rotary recording medium;
   phase detecting means for detecting a predetermined rotation phase of the rotary recording medium to produce a phase detect signal; and
   control means responsive to a shutter release button and said phase detecting means for controlling said solid-state imaging means, exposing means, and recording means, the unit of video signals being recorded on the rotary recording medium in a rotation beginning from the predetermined rotation phase of the rotary recording medium with reference to the phase detect signal;
   said exposing means supplying said exposing means in response to the shutter release button with a first instruction signal for opening the optical shutter at a point of time advanced by an exposure time with respect to the phase detect signal;
   said control means supplying a driving signal to said imaging means immediately before the optical shutter is opened to cause said imaging means to discharge electric charges therefrom;
   said control means supplying a second instruction signal to said exposing means to close the optical shutter;

said control means supplying, when the optical shutter is closed, a driving signal to said imaging means at an ordinary video signal rate to cause electric charges in said imaging means to be developed in the form of a unit of video signals for supply to said recording means, said recording means recording the unit of video signals on the recording medium.

2. An electronic still camera according to claim 1 wherein said control means includes exposure time calculating means for measuring a light incident to said imaging means to calculate an exposure time;

said control means supplying the first instruction signal to said exposing means at a point of time advanced by the calculated exposure time with reference to the phase detect signal.

3. An electronic still camera according to claim 1 wherein said control means includes exposure time setting means for setting an exposure time;

said control means supplying the first instruction signal to said exposing means at a point of time advanced by the set exposure time with reference to the phase detect signal.

4. An electronic still camera according to claim 1 wherein said control means inhibits video signals from being developed from said solid-state imaging means while the optical shutter is being opened.

* * * * *